United States Patent
Boston et al.

(10) Patent No.: US 11,462,020 B2
(45) Date of Patent: Oct. 4, 2022

(54) TEMPORAL CNN REAR IMPACT ALERT SYSTEM

(71) Applicant: Ford Global Technologies, LLC, Dearborn, MI (US)

(72) Inventors: Daniel Lewis Boston, Dearborn, MI (US); Phillip Morris, Redford, MI (US); Michael Dennis, Brighton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 239 days.

(21) Appl. No.: 16/733,664

(22) Filed: Jan. 3, 2020

(65) Prior Publication Data
US 2021/0209381 A1 Jul. 8, 2021

(51) Int. Cl.
| | |
|---|---|
| G06V 20/58 | (2022.01) |
| G06N 3/04 | (2006.01) |
| G06N 3/08 | (2006.01) |
| G06K 9/62 | (2022.01) |
| B60W 50/14 | (2020.01) |
| B60W 60/00 | (2020.01) |

(52) U.S. Cl.
CPC ............ G06V 20/58 (2022.01); B60W 50/14 (2013.01); B60W 60/0051 (2020.02); G06K 9/6262 (2013.01); G06K 9/6267 (2013.01); G06N 3/0454 (2013.01); G06N 3/08 (2013.01); *B60W 2050/143* (2013.01)

(58) Field of Classification Search
CPC ........... B60W 2050/143; B60W 30/08; B60W 30/09; B60W 40/02; B60W 40/04; B60W 50/14; B60W 60/0051; G06K 9/00805; G06K 9/6262; G06K 9/6267; G06K 9/6271; G06N 3/0454; G06N 3/08
See application file for complete search history.

(56) References Cited

U.S. PATENT DOCUMENTS

| | | | |
|---|---|---|---|
| 10,055,652 B2 | 8/2018 | Myers et al. | |
| 2010/0289631 A1* | 11/2010 | Rao | B60T 7/22 348/148 |
| 2018/0201227 A1* | 7/2018 | Gao | B60R 25/305 |
| 2019/0016264 A1 | 1/2019 | Potnis et al. | |
| 2019/0213451 A1* | 7/2019 | Schäfer | G06V 10/10 |
| 2019/0258251 A1* | 8/2019 | Ditty | G06V 20/58 |

(Continued)

OTHER PUBLICATIONS

Jae Kyu Suh,"Rearview Camera-Based Backover Warning System Exploiting a Combination of Pose-Specific Pedestrian Recognitions," Jun. 30, 2017,IEEE Transactions on Intelligent Transportation Systems, vol. 19, No. 4, Apr. 2018,pp. 1122-1128.*

(Continued)

*Primary Examiner* — Omar S Ismail
(74) *Attorney, Agent, or Firm* — Brandon Hicks; Bejin Bieneman PLC

(57) ABSTRACT

The present disclosure discloses a system and a method. In an example implantation, the system and the method can receive an image at a first deep neural network, estimate a distance between an object depicted in the image and a vehicle, wherein the first deep neural network estimates the distance, determine whether the estimated distance is greater than a predetermined distance threshold, and generate an alert when the estimated distance is not greater than the predetermined distance threshold.

20 Claims, 7 Drawing Sheets

(56) References Cited

U.S. PATENT DOCUMENTS

2019/0337451 A1\* 11/2019 Bacchus ................ B60Q 9/008
2020/0293064 A1\* 9/2020 Wu ...................... G06V 20/597
2021/0117701 A1\* 4/2021 Janardhana .......... G06V 10/454
2021/0129868 A1\* 5/2021 Nehmadi ............... G01C 21/26

OTHER PUBLICATIONS

Hunjae Yoo,"Real-time rear obstacle detection using reliable disparity for driver assistance," Mar. 11, 2016,Expert Systems with Applications,vol. 56, Sep. 1, 2016, pp. 186-194.\*

Yaran Chen,"Multi-task learning for dangerous object detection in autonomous driving," Aug. 10, 2017, Information Sciences vol. 432, Mar. 2018, pp. 559-569.\*

Jeffrey, "Smart Enhanced Back-Up Camera (SmartEBC) for CV220X Image Cognition Processors", https://www.embedded-vision.com/platinum-members/freescale/embedded-vision-training/documents/pages/smart-enhanced-backup-camera.

\* cited by examiner

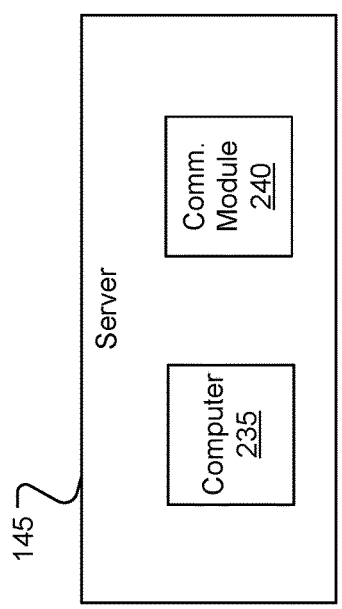
FIG. 2
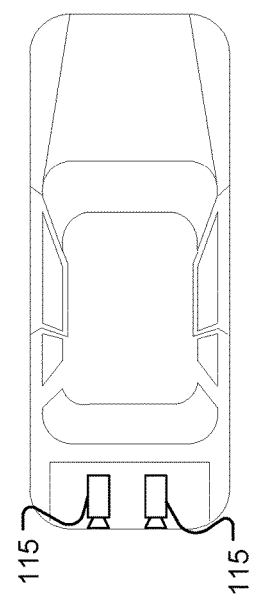
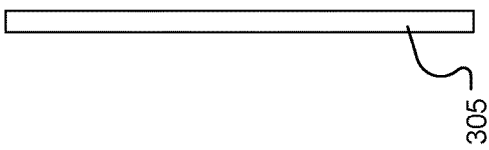
FIG. 3

TEMPORAL CNN REAR IMPACT ALERT SYSTEM

BACKGROUND

Deep neural networks (DNNs) can be used to perform many image understanding tasks, including classification, segmentation, and captioning. For example, convolutional neural networks can take an image as input, assign an importance to various aspects/objects depicted within the image, and differentiate the aspects/objects from one another.

BRIEF DESCRIPTION OF THE DRAWINGS

FIG. 2 is a diagram of an example server within the system.

FIG. 3 is a diagram illustrating a vehicle including one or more camera sensors.

DETAILED DESCRIPTION

Figure 1:
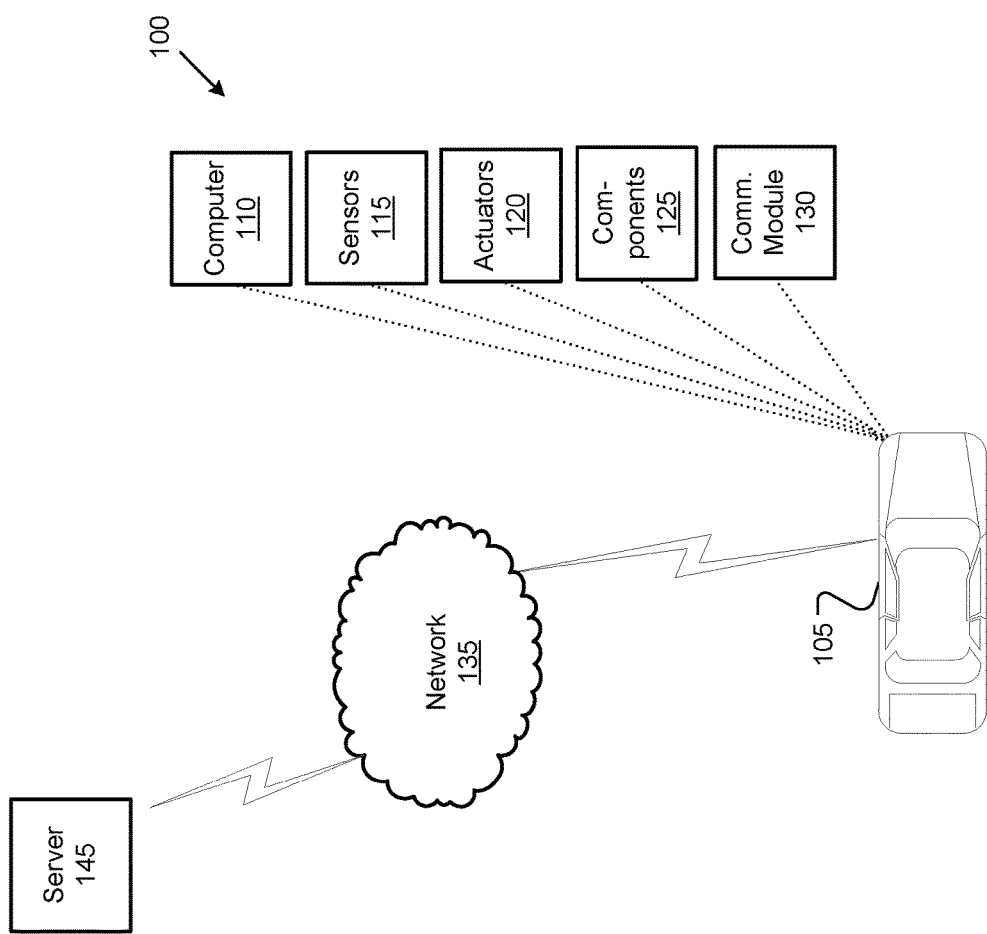
FIG. 1 is a diagram of an example system including a vehicle.

A system comprises a computer including a processor and a memory, and the memory including instructions such that the processor is programmed to receive an image at a first deep neural network, estimate a distance between an object depicted in the image and a vehicle, wherein the first deep neural network estimates the distance, determine whether the estimated distance is greater than a predetermined distance threshold, and generate an alert when the estimated distance is not greater than the predetermined distance threshold.

In other features, the processor is further programmed to determine whether the vehicle has stopped or is moving in an opposite direction, and actuate the vehicle when the vehicle has not stopped and is not moving in the opposite direction.

In other features, the processor is further programmed to cause the vehicle to transition from a non-autonomous mode to an autonomous mode.

In other features, the first deep neural network comprises at least one of a temporal convolutional neural network or a long short-term memory neural network.

In other features, the processor is further programmed to continue estimating the distance of the object after the object is no longer depicted within the image.

In other features, the processor is further programmed to receive the image at a second deep neural network, classify, via the second deep neural network, at least one object depicted within the image, assign an object type to the at least one classified object, and generate an alert based on the object type.

In other features, the second deep neural network comprises a convolutional neural network.

In other features, the object type corresponds to a preassigned risk factor corresponding to the classified object.

In other features, the processor is further programmed to determine whether the vehicle has stopped or is moving in an opposite direction, and actuate the vehicle when the vehicle has not stopped and is not moving in the opposite direction.

In other features, the processor is further programmed to cause the vehicle to transition from a non-autonomous mode to an autonomous mode.

A method comprises receiving an image at a first deep neural network, estimating a distance between an object depicted in the image and a vehicle, wherein the first deep neural network estimates the distance, determining whether the estimated distance is greater than a predetermined distance threshold, and generating an alert when the estimated distance is not greater than the predetermined distance threshold.

In other features, the method further comprises determining whether the vehicle has stopped or is moving in an opposite direction, and actuating the vehicle when the vehicle has not stopped and is not moving in the opposite direction.

In other features, the method further comprises causing the vehicle to transition from a non-autonomous mode to an autonomous mode.

In other features, the first deep neural network comprises at least one of a temporal convolutional neural network or a long short-term memory neural network.

In other features, the method further comprises continue estimating the distance of the object after the object is no longer depicted within the image.

In other features, the method further comprises receiving the image at a second deep neural network, classifying, via the second deep neural network, at least one object depicted within the image, assigning an object type to the at least one classified object, and generating an alert based on the object type.

In other features, the object type corresponds to a preassigned risk factor corresponding to the classified object.

A system comprises a computer including a processor and a memory, and the memory includes instructions such that the processor is programmed to: train a deep neural network with a set of labeled training images, wherein the set of labeled training images comprises at least one training image depicting an object within a field-of-view of a vehicle camera and at least one training label indicating a distance between the object and the vehicle camera; generate an output based on at least one non-labeled training image at the deep neural network, wherein the output is indicative of a distance between an object depicted in the at least one non-labeled training image and an image source; compare the output with ground truth data; and update at least one weight associated with a neuron of the deep neural network.

In other features, the distance corresponding to the at least one training label is measured by a vehicle ultrasonic sensor.

In other features, the deep neural network comprises at least one of a temporal convolutional neural network or a long short-term memory neural network.

Autonomous vehicles typically employ perception algorithms to perceive the environment around the vehicle. The perception algorithms can use one or more deep neural networks to assist in classifying objects.

Currently, vehicles employ dedicated ultrasonic sensors to measure distances between detected objects and the vehicle. However, these ultrasonic sensors add costs to the vehicle. The present disclosure discloses a vehicle that does not require ultrasonic sensors to estimate a distance between an object and the vehicle. The vehicle may include one or more deep neural networks that can estimate a distance between an object depicted within an image and generate an alert based on the estimated distance. Additionally or alternatively, the vehicle may include one or more deep neural networks that can classify objects within an image. The classified objects can also be assigned an object type that includes a preassigned risk factor such that an alert can be generated based on the object type.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

FIG. 3 illustrates the vehicle 105 including one or more rear-facing camera sensors 115, e.g., backup cameras. The rear-facing camera sensor 115 are configured to capture images representing the environment to the rear of the vehicle 105. As described in greater detail herein, the images are provided as input to one or more neural networks. The neural networks may be configured to determine a distance between the rear of the vehicle 105 and an object, such as object 305, depicted within the image. The neural networks may also be configured to detect and to classify objects depicted within the image. It is understood that the vehicle 105 may also include one or more front-facing camera sensors 115 in accordance with the present disclosure.

Figure 4:
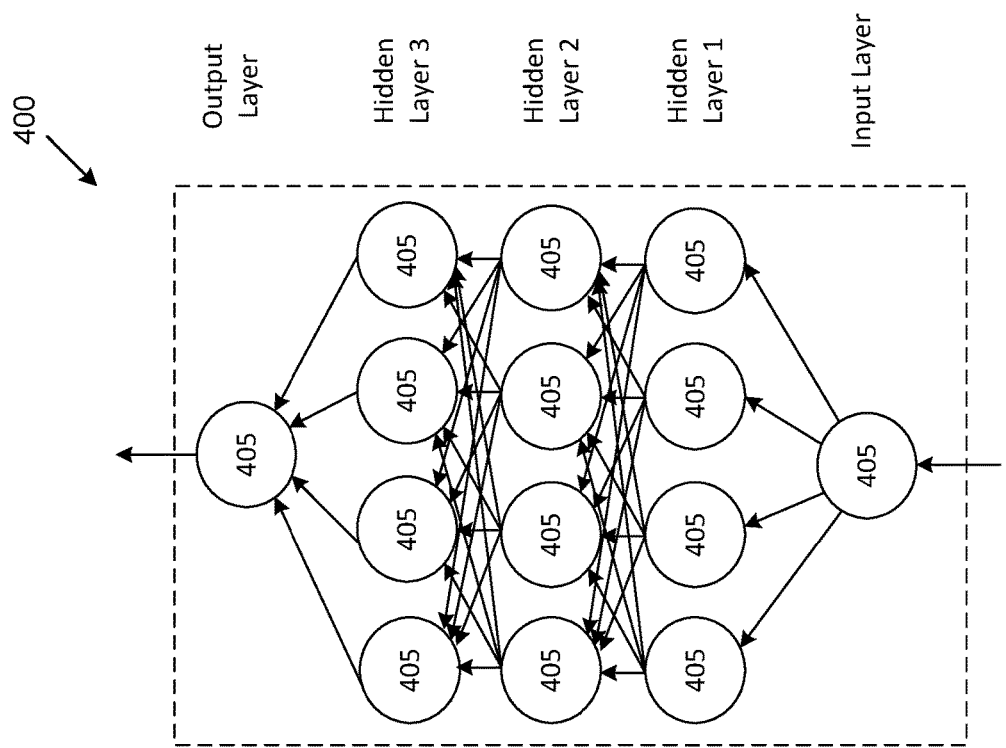
FIG. 4 is a diagram of an example deep neural network.

FIG. 4 is a diagram of an example deep neural network (DNN) 400. The DNN 400 may be representative of one or more neural networks described herein. The DNN 400 includes multiple nodes 405, and the nodes 405 are arranged so that the DNN 400 includes an input layer, one or more hidden layers, and an output layer. Each layer of the DNN 400 can include a plurality of nodes 405. While FIG. 4 illustrates three (3) hidden layers, it is understood that the DNN 400 can include additional or fewer hidden layers. The input and output layers may also include more than one (1) node 405.

The nodes 405 are sometimes referred to as artificial neurons 405, because they are designed to emulate biological, e.g., human, neurons. A set of inputs (represented by the arrows) to each neuron 405 are each multiplied by respective weights. The weighted inputs can then be summed in an input function to provide, possibly adjusted by a bias, a net input. The net input can then be provided to activation function, which in turn provides a connected neuron 405 an output. The activation function can be a variety of suitable functions, typically selected based on empirical analysis. As illustrated by the arrows in FIG. 4, neuron 405 outputs can then be provided for inclusion in a set of inputs to one or more neurons 405 in a next layer.

The DNN 400 can be trained to accept data as input and generate an output based on the input. The DNN 400 can be trained with ground truth data, i.e., data about a real-world condition or state. For example, the DNN 400 can be trained with ground truth data or updated with additional data by a processor. Weights can be initialized by using a Gaussian distribution, for example, and a bias for each node 405 can be set to zero. Training the DNN 400 can including updating weights and biases via suitable techniques such as back-propagation with optimizations. Ground truth data can include, but is not limited to, data specifying objects within an image or data specifying a physical parameter, e.g., angle, speed, distance, or angle of object relative to another object. For example, the ground truth data may be data representing objects and object labels. As described herein, the DNN 400 may comprise one or more convolutional neural networks.

Figure 5:
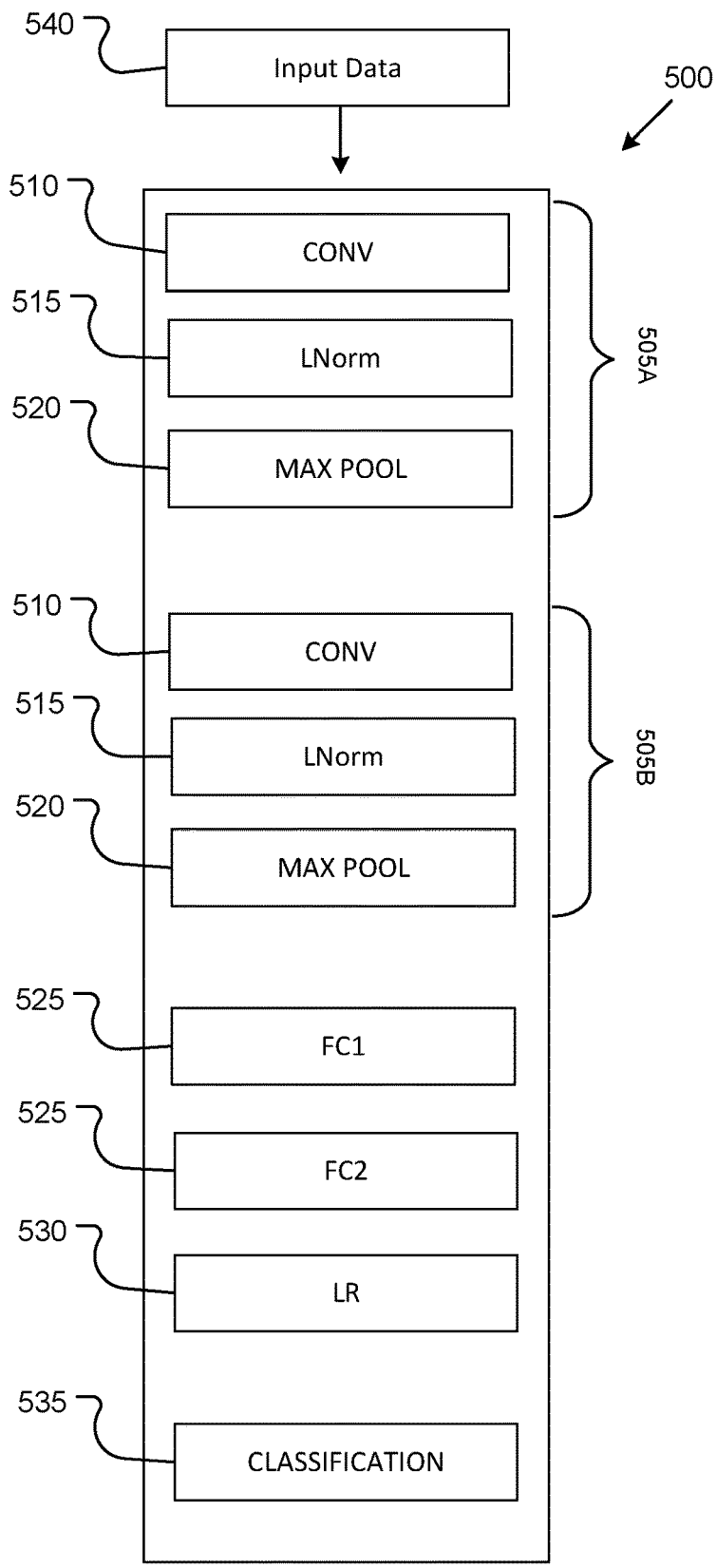
FIG. 5 is a diagram of an example convolutional neural network.

FIG. 5 is a block diagram illustrating an example DNN 400. In the implementation illustrated in FIG. 5, the DNN 400 is a convolutional neural network 500. The convolutional neural network 500 may include multiple, different types of layers based on connectivity and weight sharing. As shown in FIG. 5, the convolutional neural network 500 includes convolution blocks 505A, 505B. Each of the convolution blocks 505A. 505B may be configured with a convolution layer (CONV) 510, a normalization layer (LNorm) 515, and a max pooling layer (MAXPOOL) 520.

The convolution layers 510 may include one or more convolutional filters, which are be applied to the input data. 545 to generate an output 540. While FIG. 5 illustrates only two convolution blocks 505A. 505B, the present disclosure may include any number of the convolution blocks 505A, 505B. The normalization layer 515 may normalize the output of the convolution filters. For example, the normalization layer 515 may provide whitening or lateral inhibition. The max pooling layer 520 may provide down sampling aggregation over space for local invariance and dimensionality reduction.

The deep convolutional network 500 may also include one or more fully connected layers 525 (FC1 and FC2). The deep convolutional network 500 may further include a logistic regression (LR) layer 530. Between each layer 510, 515, 520, 525, 530 of the deep convolutional network 500 are weights that can be updated. The output of each of the layers (e.g., 510, 515, 520, 525, 530) may serve as an input of a succeeding one of the layers (e.g., 510, 515, 520, 525, 530) in the convolutional neural network 500 to learn object classifications from input data 540 images, audio, video, sensor data and/or other input data) provided at the first of the convolution blocks 505A. The output 535 of the convolutional neural network 500 can represent a classification prediction based on the input data. For example, the output 535 may be a set of probabilities indicative of a classification of an object and/or object type depicted within the input data.

Figure 6A:
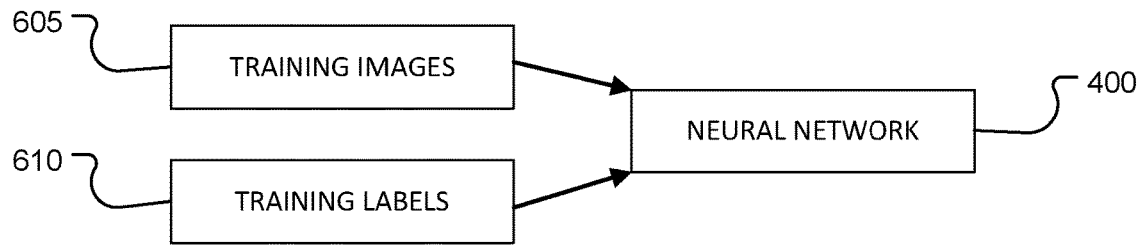
FIG. 6A is a diagram illustrating an example process for training a deep neural network.
Figure 6B:
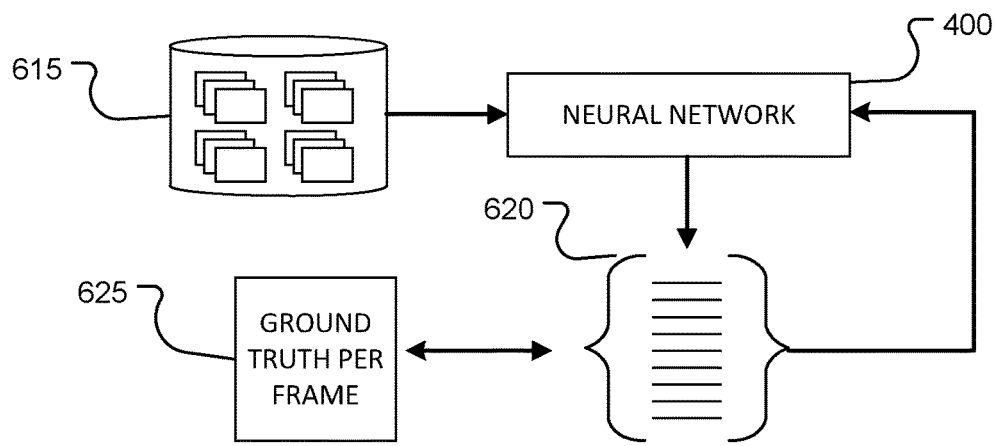
FIG. 6B is another diagram illustrating an example process for training a deep neural network.

FIGS. 6A and 6B illustrate an example process for training the DNN 400 in accordance with one or more implementations of the present disclosure. As shown in FIG. 6A, during an initial training phase, a DNN receives a set of labeled training images (e.g., training images 605 and training labels 610). The training images 605 may depict objects within a field-of-view (FOV) of a vehicle camera. The training labels 610 may comprise object labels, object type labels, and/or distance of the object with respect to the source of the image, e.g., distances measured by ultrasonic sensors of a vehicle. After the initial training phase, at a supervised training phase, a set of N training images 615 are input to the DNN 400. The DNN 400 generates outputs indicative of the object classifications and/or object types action for each of the N training images 615.

FIG. 613 illustrates an example of generating output for one training image 615, such as a non-labeled training image, of the N training images 615, Based on the initial training, the DNN 400 outputs a vector representation 620 of the proposed descriptions (e.g., object classifications, object types). The vector representation 620 is compared to the ground-truth data 625. The DNN 400 updates network parameters based on the comparison to the ground-truth boxes 625. For example, the network parameters, e.g., weights associated with the neurons, may be updated via backpropagation. It is understood that vehicle data received from a fleet of vehicles may be used for training the DNN 400. The vehicle data may comprise distance data. measured by ultrasonic sensors and corresponding image data captured by the vehicle image sensors. The DNN 400 may be trained at the server 145 and provided to the vehicle 105 via the communication network 135. The vehicle 105 may also provide data captured by the vehicle 105 systems to the server 145 for further training purposes.

Figure 6C:
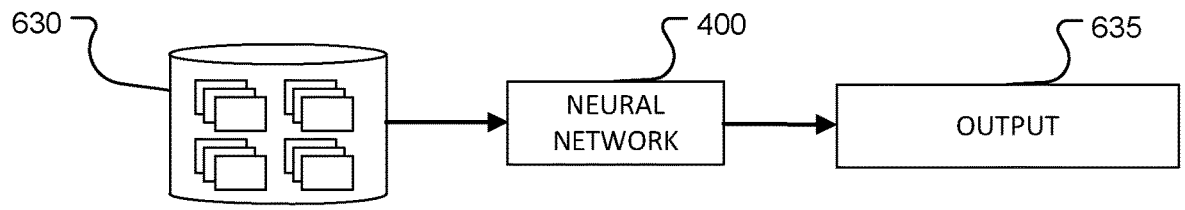
FIG. 6C is a diagram illustrating an example process for generating output at a deep neural network based on received input.

After training, the DNN 400 may be used to classify objects depicted within received images as shown in FIG. 6C. The output of the DNN 400 is an object classification and/or object type. It is understood that more than one DNN 400 may be trained. For example, a first DNN 400 may be trained to estimate a distance between an object and the image source, and a second DNN 400 may be trained to classify objects and object types.

Object classification may be defined as the process of identifying objects by classifying the objects into one of a finite set of classes. An object type may be defined as a risk factor associated with the classified object. In one or more implementations, the risk factors may be preassigned to various types of objects.

In one or more implementations, the vehicle 105 may include multiple DNNs 400 For example, the vehicle 105 computer 110 may include a first DNN 400 that is configured to estimate a distance between an object depicted within the image and the image source and may include a second DNN 400 that is configured to classify objects and/or assign object types to classified objects. The computer 110 can generate one or more alerts within the vehicle 105 based on the estimated distance and/or the classified objects/object types. In an example implementation, the computer 110 can generate an alert when an estimated distance is less than or equal to a predetermined distance threshold. Additionally or alternatively, the computer 110 can generate an alert based on the classified object and/or object type. The alert associated with the classified object may be based on a preassigned risk factor corresponding to the classified object and/or object type.

In various implementations, the DNN(s) 400 may comprise various types of deep neural networks. For example, the DNN(s) 400 may comprise a convolutional neural network (CNN), a temporal convolutional neural network (TCNN), a recurrent neural network (RNN), or a long short-term memory (LSTM) neural network.

Figure 7:
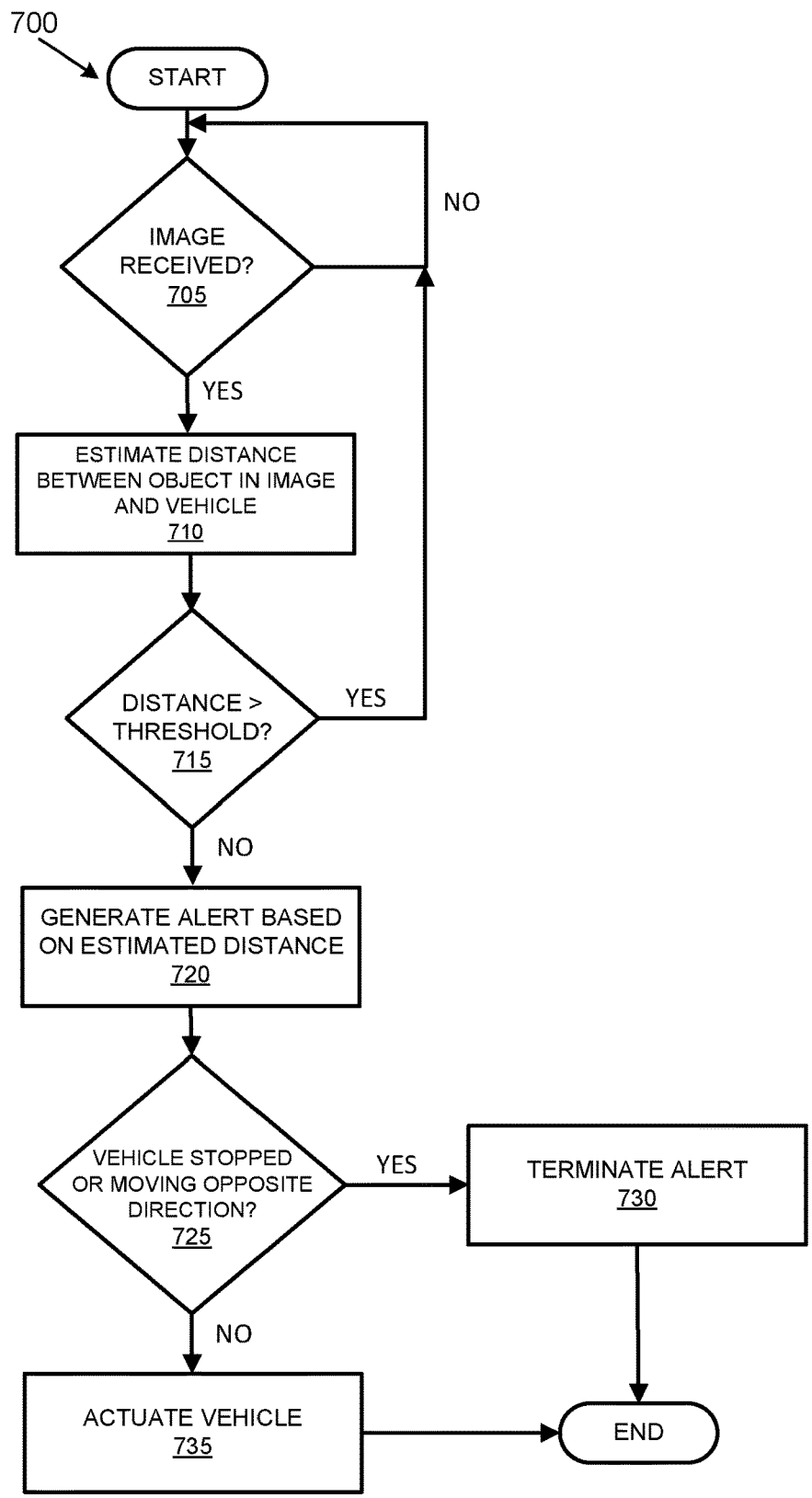
FIG. 7 is a flow diagram illustrating an example process for generating an alert based on an estimated distance between a vehicle and an object.

FIG. 7 is a flowchart of an exemplary process 700 for estimating a distance using a DNN 400. Blocks of the process 700 can be executed by the computer 110. The process 700 begins at block 705 in which a determination is made whether an image is received. For example, the image may be an image captured by a vehicle 105 sensor 115. If no image is received, the process 700 returns to block 705. If an image is received, the DNN 400 estimates a distance between one or more objects depicted within the image and the image source, such as the vehicle 105 sensor 115 at block 710. As described above, the DNN 400 may be trained to estimate distances between objects detected by the DNN 400 within the image and the image source.

At block 715, a determination is made whether the estimated distance is greater than a predetermined distance threshold. If the distance is greater than the predetermined distance threshold, the process 700 returns to block 705. If the distance is less than or equal to the distance threshold, an alert is generated based on the estimated distance at block 720. In an example implementation, the computer 110 may use a lookup table, or the like, to determine an alert to generate based on the estimated distance. For instance, the computer 110 can generate alerts that vary with estimated distances. In some examples, the computer 110 can vary an audible characteristic, a visual characteristic, and/or a frequency characteristic of the alert based on the estimated distance. The alert may comprise an audible alert and/or a visual alert generated within the vehicle 105. In some implementations, the DNN 400 may be trained to continue estimating a distance after the object has left a field-of-view of the sensors 115. In these implementations, the DNN 400 may comprise a TCNN or a LTSM network such that the DNN 400 can continue estimating a distance using time series image data.

At block 725, a determination is made whether the vehicle 105 has stopped moving or is moving in a different direction relative to the object(s). In one or more implementations, the computer 110 may determine that the vehicle 105 is moving in another direction if the estimated distance increases with respect to previous estimated distances. In one or more implementations, the computer 110 may determine that the vehicle 105 is not moving if the estimated distance has not changed with respect to previous estimated distances, one or more control components 125 indicate no torque is being generated by the vehicle 105. If the vehicle 105 has stopped moving or the vehicle 105 is moving in a different direction, the alert is terminated at block 730 and the process 700 ends.

Otherwise, the vehicle 105 is actuated at block 735. For example, the computer 110 may send a control signal to one or more components 125 to cause the vehicle 105 to stop moving or cause the vehicle 105 to move in another direction. In some examples, the computer 110 may cause the vehicle 105 from an autonomous mode to a semi-autonomous mode or manual mode or vice versa.

Figure 8:
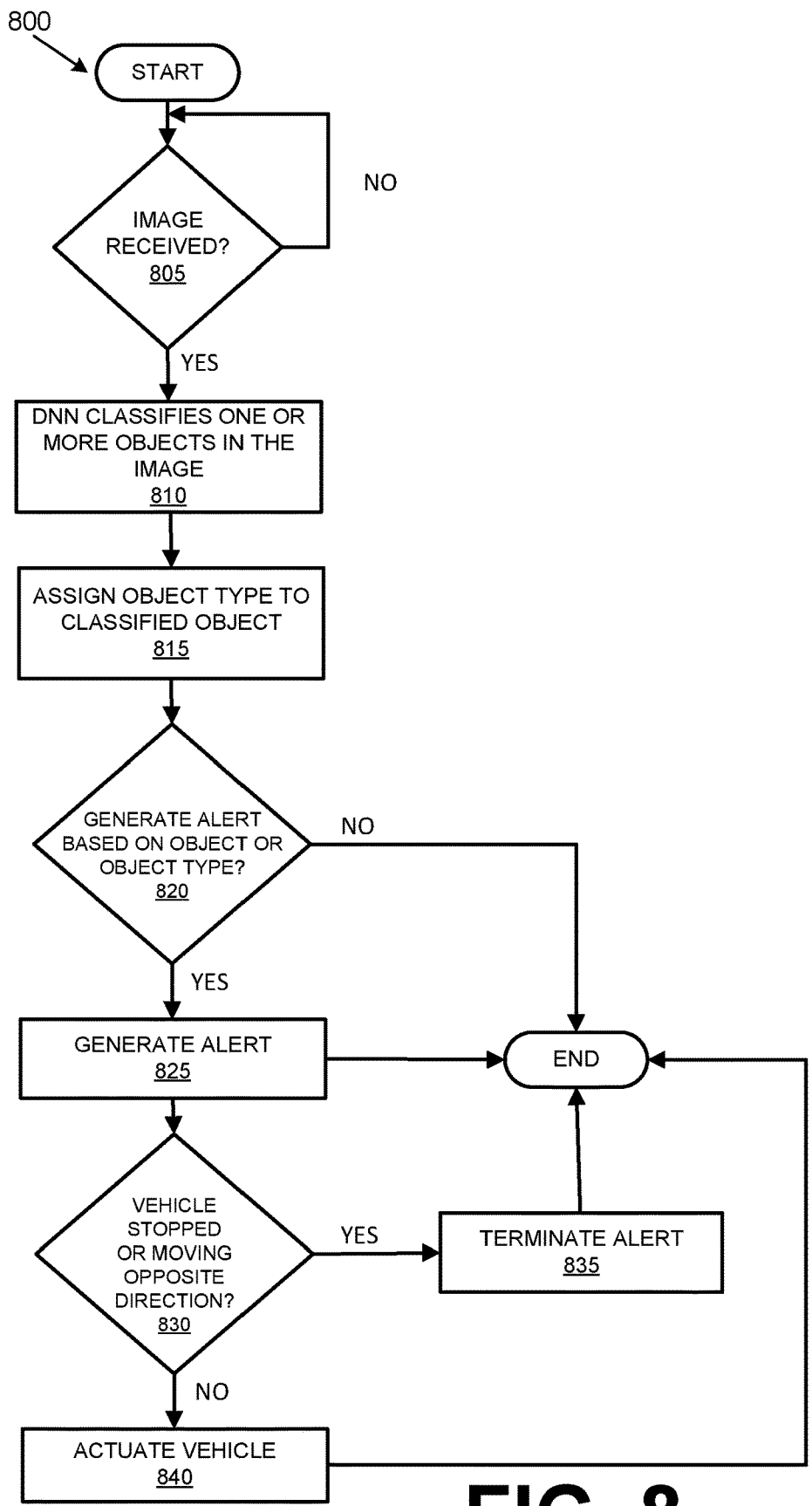
FIG. 8 is a flow diagram illustrating an example process for generating an alert based on a classified object and object type.

FIG. 8 is a flowchart of an exemplary process 800 for classifying an object and/or object type and determining whether to generate an alert based on the classification. Blocks of the process 800 can be executed by the computer 110. The process 800 begins at block 805 in which a determination is made whether an image is received. For example, the image may be an image captured by a vehicle 105 sensor 115. If no image is received, the process 800 returns to block 805. If an image is received, the DNN 400 classifies one or more objects depicted within the image at block 810.

At block 815, an object type is assigned to the classified object. In one or more implementations, the DNN 400 may be configured to assign the object type to the classified object. For example, the DNN 400 may be trained to further assign object types to classified. In other implementations, the computer 110 may be configured to assign the object type to the classified object. For example, the computer 110 may use a lookup table that includes various objects and corresponding object types. As discussed above, the object types may include a risk factor associated with the objects.

A determination is made whether to generate an alert or modify an existing alert based on the object or object type at block 820. Within the present disclosure, the process 800 may be used in conjunction with the process 700 described above. For example, the computer 110 may have previously generated an alert based on the estimated distance. Additionally or alternatively, the computer 110 may generate an alert (if one was not generated based on the estimated distance) based on the classified object or object type. For instance, the computer 110 may be configured to generate the alert based on the object or object type even if the estimated distance is greater than the predetermined threshold. In other instances, the computer 110 may be configured to modify an existing alert, e.g., an estimated distance alert, depending on the classified object or object type, e.g., a pedestrian is detected within a received image.

If the computer 110 determines to generate an alert or modify an alert based on the object or object type, the alert is generated or modified at block 825. Otherwise, the process 800 ends. At block 830, a determination is made whether the vehicle 105 has stopped moving or is moving in a different direction relative to the object(s). If the vehicle 105 has stopped moving or the vehicle 105 is moving in a different direction, the alert is terminated at block 835, and the process 800 ends. Otherwise, the vehicle 105 is actuated at block 840. For example, the computer 110 may send a control signal to one or more components 125 to cause the vehicle 105 to stop moving or cause the vehicle 105 to move in another direction. In some examples, the computer 110 may cause the vehicle 105 from an autonomous mode to a semi-autonomous mode or manual mode or vice versa.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to: receive an image at a first deep neural network; estimate a distance between an object depicted in the image and a vehicle, wherein the first deep neural network estimates the distance; determine whether the estimated distance is greater than a predetermined distance threshold; generate an alert when the estimated distance is not greater than the predetermined distance thresholds determine whether the vehicle has stopped or is moving in an opposite direction; and actuate the vehicle when the vehicle has not stopped and is not moving in the opposite direction.

2. The system of claim 1, wherein the processor is further programmed to: cause the vehicle to transition from a non-autonomous mode to an autonomous mode.

3. The system of claim 1, wherein the first deep neural network comprises at least one of a temporal convolutional neural network or a long short-term memory neural network.

4. The system of claim 3, wherein the processor is further programmed to continue estimating the distance of the object after the object is no longer depicted within the image.

5. The system of claim 1, wherein the processor is further programmed to: receive the image at a second deep neural network; classify, via the second deep neural network, at least one object depicted within the image; assign an object type to the at least one classified object; and generate an alert based on the object type.

6. The system of claim 5, wherein the second deep neural network comprises a convolutional neural network.

7. The system of claim 5, wherein the object type corresponds to a preassigned risk factor corresponding to the classified object.

8. The system of claim 5, wherein the processor is further programmed to: determine whether the vehicle has stopped or is moving in an opposite direction; and actuate the vehicle when the vehicle has not stopped and is not moving in the opposite direction.

9. The system of claim 8, wherein the processor is further programmed to: cause the vehicle to transition from a non-autonomous mode to an autonomous mode.

10. A method comprising: receiving an image at a first deep neural network; estimating a distance between an object depicted in the image and a vehicle, wherein the first deep neural network estimates the distance; determining whether the estimated distance is greater than a predetermined distance threshold; generating an alert when the estimated distance is not greater than the predetermined distance thresholds determining whether the vehicle has stopped or is moving in an opposite direction; and actuating the vehicle when the vehicle has not stopped and is not moving in the opposite direction.

11. The method of claim 10, further comprising: causing the vehicle to transition from a non-autonomous mode to an autonomous mode.

12. The method of claim 10, wherein the first deep neural network comprises at least one of a temporal convolutional neural network or a long short-term memory neural network.

13. The method of claim 12, further comprising continuing to estimate the distance of the object after the object is no longer depicted within the image.

14. The method of claim 10, further comprising: receiving the image at a second deep neural network; classifying, via the second deep neural network, at least one object depicted within the image; assigning an object type to the at least one classified object; and generating an alert based on the object type.

15. The method of claim 14, wherein the object type corresponds to a preassigned risk factor corresponding to the classified object.

16. A system comprising a computer including a processor and a memory, the memory including instructions such that the processor is programmed to: train a deep neural network with a set of labeled training images, wherein the set of labeled training images comprises at least one training image depicting an object within a field-of-view of a vehicle camera and at least one training label indicating a distance between the object and the vehicle camera; generate an output based on at least one non-labeled training image at the deep neural network, wherein the output is indicative of a distance between an object depicted in the at least one non-labeled training image and an image source; compare the output with ground truth data; and update at least one weight associated with a neuron of the deep neural network.

17. The system of claim 16, wherein the distance corresponding to the at least one training label is measured by a vehicle ultrasonic sensor.

18. The system of claim 16, wherein the deep neural network comprises at least one of a temporal convolutional neural network or a long short-term memory neural network.

19. The system of claim 1, wherein the vehicle is actuated by controlling one or more of vehicle powertrain controller, vehicle steering controller, and vehicle brake controller.

20. The method of claim 10, wherein the vehicle is actuated by controlling one or more of vehicle powertrain controller, vehicle steering controller, and vehicle brake controller.

* * * * *